US007330729B2

(12) United States Patent
Niwa et al.

(10) Patent No.: US 7,330,729 B2
(45) Date of Patent: Feb. 12, 2008

(54) MOBILE TERMINAL DEVICE AND POSITIONAL INFORMATION SYSTEM

(75) Inventors: Satoshi Niwa, Tokyo (JP); Masaki Ichihara, Tokyo (JP)

(73) Assignee: NEC Corporation, Tokyo (JP)

( * ) Notice: Subject to any disclaimer, the term of this patent is extended or adjusted under 35 U.S.C. 154(b) by 773 days.

(21) Appl. No.: 10/334,067

(22) Filed: Dec. 31, 2002

(65) Prior Publication Data

US 2003/0129995 A1 Jul. 10, 2003

(30) Foreign Application Priority Data

Jan. 7, 2002 (JP) .............................. 2002-000478

(51) Int. Cl.
*H04Q 7/00* (2006.01)
*H04B 1/38* (2006.01)

(52) U.S. Cl. .............................. 455/456.6; 455/456.1; 455/457; 455/563; 342/357.14; 340/988

(58) Field of Classification Search ................ 340/988, 340/989, 992, 995.28; 455/456.1–456.6; 342/357.12, 357.14
See application file for complete search history.

(56) References Cited

U.S. PATENT DOCUMENTS

| | | | | |
|---|---|---|---|---|
| 4,106,022 A | * | 8/1978 | Last .......................... 342/394 |
| 5,220,509 A | * | 6/1993 | Takemura et al. ........... 701/216 |
| 5,712,899 A | * | 1/1998 | Pace, II .................... 455/456.2 |
| 5,727,057 A | * | 3/1998 | Emery et al. .......... 379/201.07 |
| 5,949,812 A | * | 9/1999 | Turney et al. ............... 375/130 |
| 5,953,677 A | | 9/1999 | Sato |
| 6,363,250 B1 | * | 3/2002 | Lindell .................... 455/422.1 |
| 6,448,927 B1 | | 9/2002 | Ishigaki et al. |
| 6,512,466 B2 | * | 1/2003 | Flick .......................... 340/989 |
| 6,587,691 B1 | * | 7/2003 | Granstam et al. ........... 455/457 |
| 6,980,814 B2 | * | 12/2005 | Nohara et al. ........... 455/456.1 |
| 2001/0004600 A1 | * | 6/2001 | Son et al. .................... 455/456 |
| 2002/0002036 A1 | * | 1/2002 | Uehara et al. ................ 455/41 |
| 2002/0128000 A1 | * | 9/2002 | do Nascimento, Jr. ...... 455/414 |

FOREIGN PATENT DOCUMENTS

| | | |
|---|---|---|
| JP | 63-045927 | 2/1988 |
| JP | 07-038950 | 2/1995 |

(Continued)

*Primary Examiner*—Lester G. Kincaid
*Assistant Examiner*—Matthew C. Sams
(74) *Attorney, Agent, or Firm*—Foley & Lardner LLP

(57) ABSTRACT

A geomagnetic sensor for detecting geomagnetism is provided in a mobile terminal device. The output value of the geomagnetic sensor is compared with a first set value that has been set in advance, and the mobile terminal device is determined to be stationary when the output value of the geomagnetic sensor continues to be smaller than a first set value for at least a first set time period that has been set in advance, and the mobile terminal device is determined to be moving when the output value of the geomagnetic sensor fluctuates by at least the first set value. The determination results are transmitted to the base station, and the base station decreases the number of times for executing a process of registering the position of the mobile terminal device to the base station when the mobile terminal device is stationary, and increases the number of times of executing the process for registering position when the mobile terminal device is moving.

4 Claims, 4 Drawing Sheets

FOREIGN PATENT DOCUMENTS

| | | |
|---|---|---|
| JP | 8-51660 | 2/1996 |
| JP | 09-305103 | 11/1997 |
| JP | 10-107718 | 4/1998 |
| JP | 10206520 A * | 8/1998 |
| JP | 11-083529 | 3/1999 |
| JP | 2000-269880 | 9/2000 |
| JP | 2001-59738 | 3/2001 |

* cited by examiner

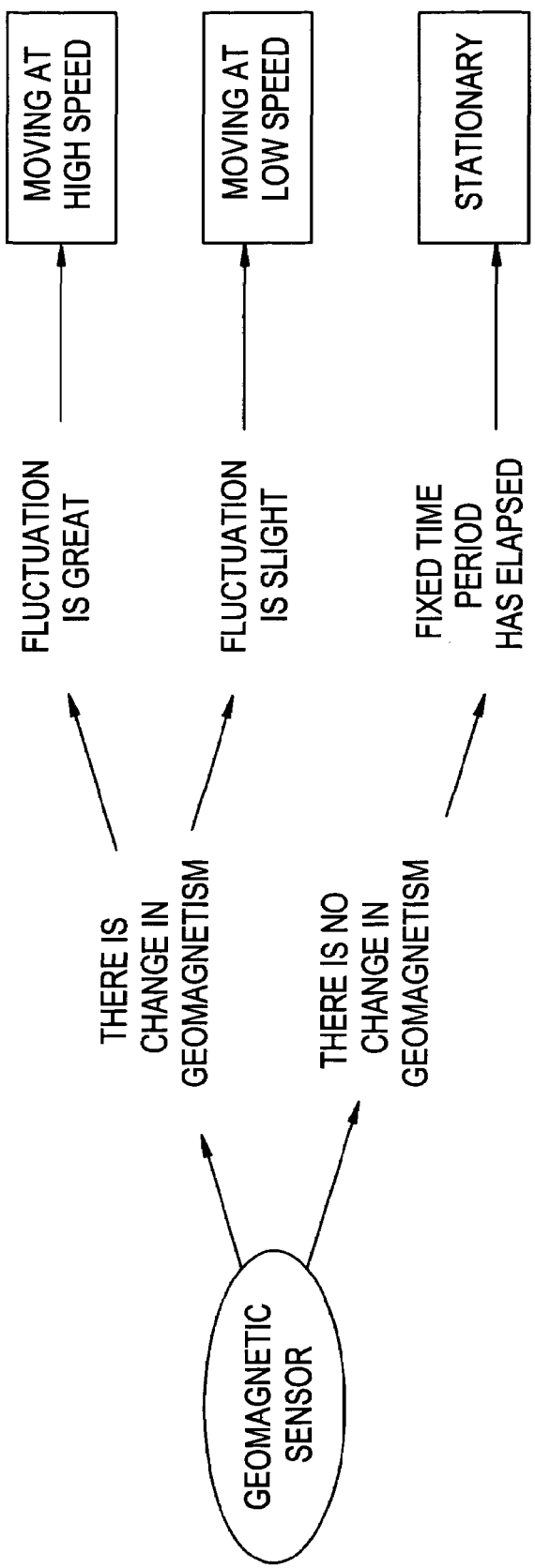

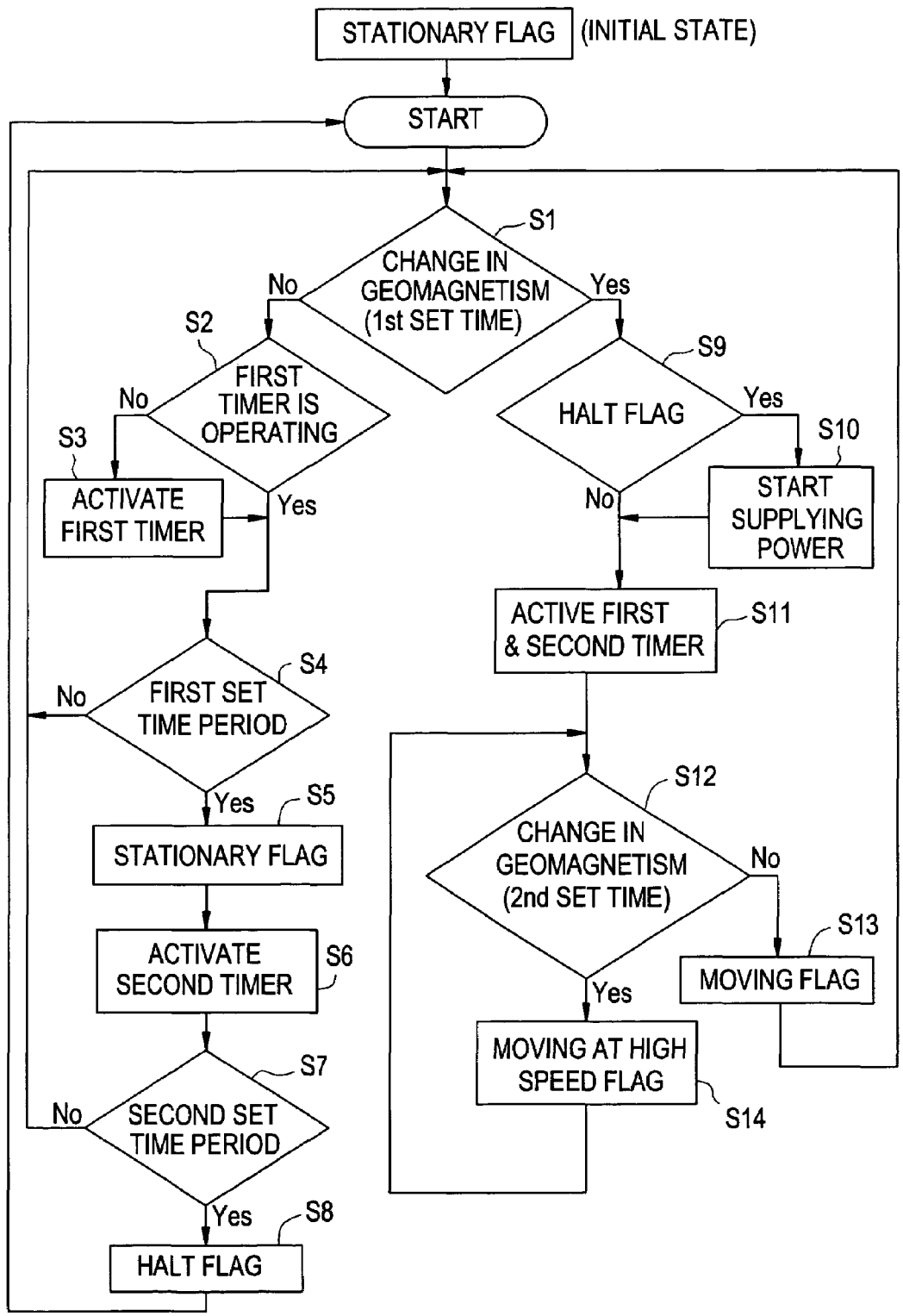

MOBILE TERMINAL DEVICE AND POSITIONAL INFORMATION SYSTEM

BACKGROUND OF THE INVENTION

1. Field of the Invention

The present invention relates to a mobile terminal device that indicates the current position, and to a positional information system that includes this mobile terminal device and a base station for sending and receiving information.

2. Description of the Related Art

In recent years, the popularization of mobile terminal devices as represented by portable telephones has been remarkable, and this popularization has seen the development of mobile terminal devices having a variety of functions. The advent of mobile terminal devices that are capable of displaying the current position is just one example.

In a positional information system for acquiring positional information of the prior art, a GPS (Global Positioning System) receiver is provided in a mobile terminal device such as car navigation system, and radiowaves received from a plurality of GPS satellites are used to specify the current position of the device. The position is displayed on a map by superposing the current position of the device on map information that has been provided beforehand or on map information of the vicinity of the mobile terminal device that is transmitted from the base station that is set up in each of prescribed areas.

Known methods of specifying the current position of a mobile terminal device include a method in which the mobile terminal device is provided with a speed sensor and acceleration sensor and the output of these sensors is used to find the amount of movement from an initial position and thus specify the current position of the mobile terminal device, and a method in which the positional information that is calculated using the outputs of a speed sensor and acceleration sensor is used together with positional information that is obtained by the above-described GPS.

The positional information system of the above-described prior art can operate more effectively if a base station or the mobile terminal device itself can determine the state of the mobile terminal device, i.e., whether the mobile terminal device is currently stationary or in motion.

However, the mobile terminal device and positional information system of the prior art were not provided with a means for determining the state of the mobile terminal device at the base station or at the mobile terminal device itself.

SUMMARY OF THE INVENTION

It is an object of the present invention to provide both a specific means for determining whether a mobile terminal device is moving or stationary as well as a positional information system that is capable of using such a means to operate effectively.

To achieve the above-described object in the positional information system of the present invention, a geomagnetic sensor is used to determine the state of a mobile terminal device and the determination results are sent to a base station. The period for executing a process of registering the position of the mobile terminal device to the base station is then made longer than a prescribed reference period when the mobile terminal device is stationary, and the period of executing the process of registering the position is made shorter than the reference period when the mobile terminal device is moving.

Carrying out this process reduces the transmission and reception of unnecessary information between the mobile terminal device and the base station. In addition, the ability to reduce the frequency of updating the position registration when the mobile terminal device is stationary both reduces power consumption and reduces the amount of consumption of the power supply that is provided in the mobile terminal device, and the mobile terminal device can therefore display positional information with greater efficiency.

In addition, in the positional information device of the present invention, set values that have been determined in advance according to the geomagnetic strength in the vicinity of the base station and that are a reference for determining the state of the mobile terminal device are transmitted from a base station to the mobile terminal device. Thus, despite changes in geomagnetism depending on location, the set values held by the mobile terminal device are updated to ideal values and the mobile terminal device can determine its own state with greater accuracy.

In the positional information system of the present invention, in response to an inquiry from a partner terminal device that wishes to send or receive speech or information with a mobile terminal device, the base station transmits the results of determining the state of the mobile terminal device to the partner terminal device. As a result, when the mobile terminal device and the partner terminal device communicate speech, the partner terminal device can, according to the state of the mobile terminal device, abandon the speech communication and convert to character communication or delay the conversation time. For example, a mobile terminal device that is moving at high speed is generally in a car or on a train, and converting to character communication or delaying the conversation time can thus therefore prevent accidents caused by conversing while driving or prevent a breaches of etiquette by reducing conversation on a train.

The above and other objects, features, and advantages of the present invention will become apparent from the following description with reference to the accompanying drawings, which illustrate examples of the present invention.

BRIEF DESCRIPTION OF THE DRAWINGS

FIG. 4 is a state transition chart showing the method of determining the state of the mobile terminal device of the present invention; and FIG. 5 is a flow chart showing the procedures for determining the state of the mobile terminal device of the present invention.

DETAILED DESCRIPTION OF THE PREFERRED EMBODIMENTS

To acquire positional information of a mobile terminal device, there are constructions that employ the above-described GPS and constructions that perform a calculation using the output of a speed sensor or acceleration sensor. The positional information system of the present invention is described below taking as an example a construction in which a mobile terminal device uses GPS to obtain positional information.

Figure 1:
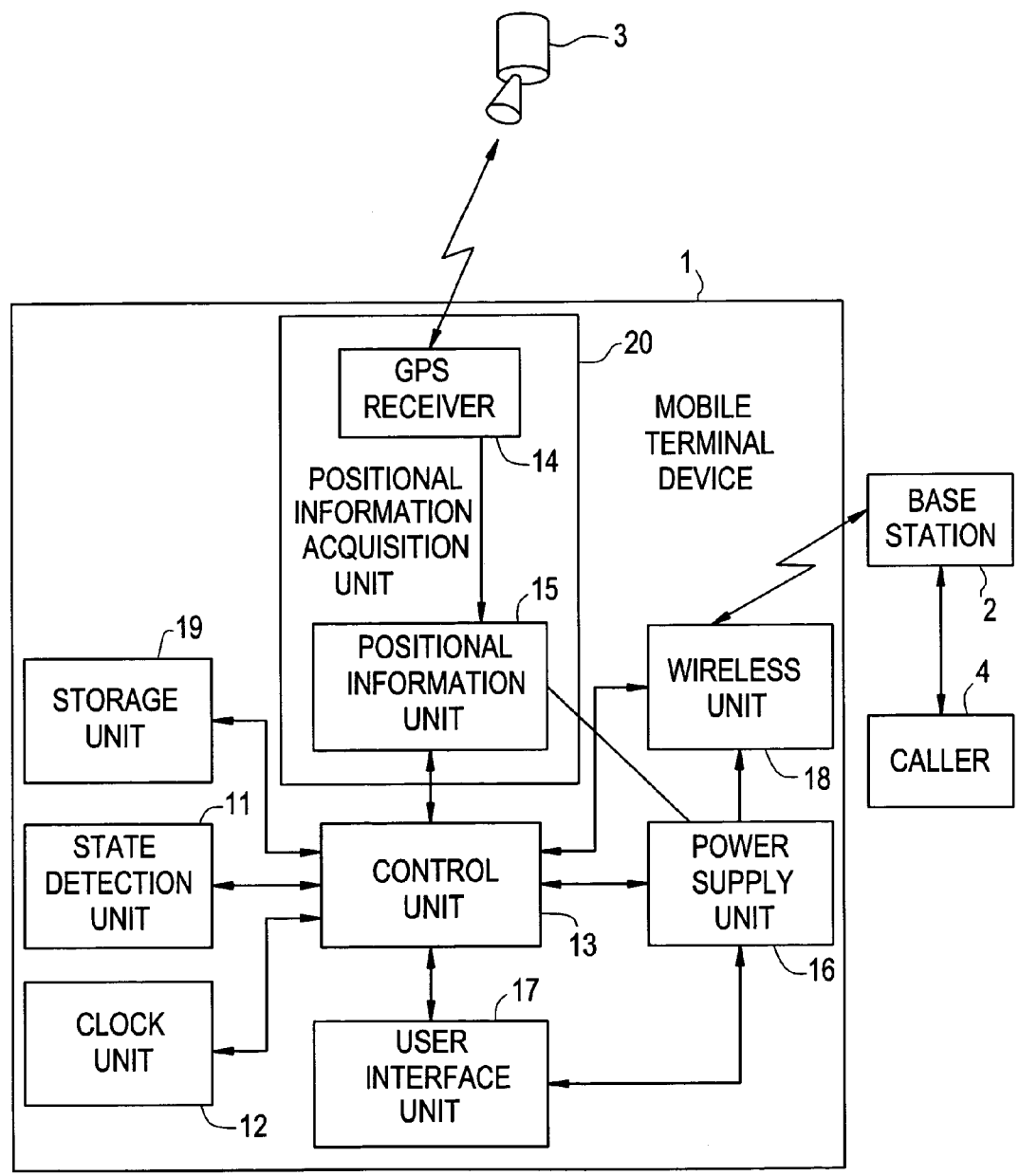
FIG. 1 is a block diagram showing an example of the construction of a positional information system and a mobile terminal device of the present invention.

As shown in FIG. 1, the positional information system of the present invention is a construction that includes mobile terminal device 1 that displays positional information and base station 2 that transmits information to and receives information from mobile terminal device 1 by means of wireless communication. Base station 2 is further connected to caller 4, which is another terminal device that sends and receives speech or information with mobile terminal device 1 by way of an exchange (not shown in the figure). Further, when mobile terminal device 1 uses GPS to obtain positional information, mobile terminal device 1 and GPS satellite 3 are connected by way of a wireless means so as to allow transmission and reception of information.

Mobile terminal device 1 is a construction that includes: state detection unit 11 for detecting the state of mobile terminal device 1; clock unit 12 for detecting a prescribed time that has been set in advance; control unit 13 that is provided with a CPU (not shown in the figure) and memory (not shown in the figure) for temporarily holding information necessary for CPU processing and that performs processing to display positional information and map information; positional information acquisition unit 20 for obtaining positional information; user interface unit 17 that is provided with a display device for displaying, for example positional information and map information, and an input device for receiving commands as input; wireless unit 18, which is a transceiver for implementing wireless communication with base station 2; storage unit 19 for storing positional information and map information; and power supply unit 16 that is provided with a battery for supplying prescribed electrical power to each of state detection unit 11, clock unit 12, control unit 13, positional information acquisition unit 20, user interface unit 17, wireless unit 18, and storage unit 19. Positional information acquisition unit 20 is a construction that includes, for example, GPS receiver 14 for receiving radiowaves from GPS satellite 3 and positional information unit 15 for specifying the current position of mobile terminal device 1 based on the signal that has been received by GPS receiver 14.

Mobile terminal device 1 of the present invention is provided with a geomagnetic sensor in state detection unit 11 and uses azimuth information that is obtained from this geomagnetic sensor to detect whether mobile terminal device 1 is moving or stationary.

Figure 2:
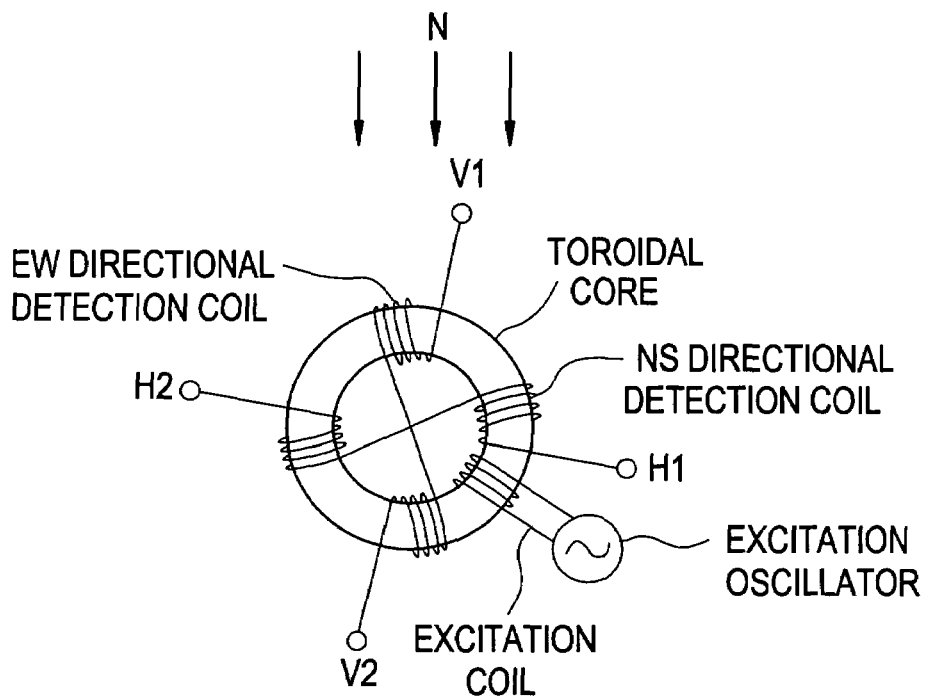
FIG. 2 is a schematic view showing an example of a geomagnetic sensor that is provided in the state detection unit shown in FIG. 1.
Figure 3:
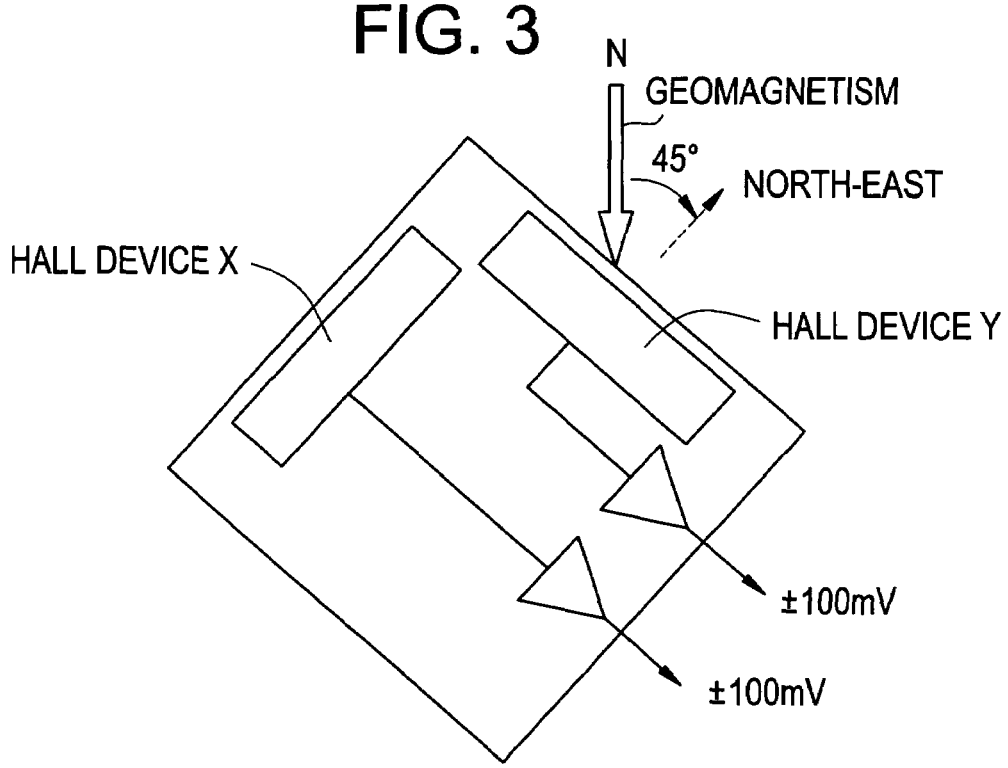
FIG. 3 is a schematic view showing another geomagnetic sensor that is provided in the state detection unit shown in FIG. 1.

The geomagnetic sensor is a sensor capable of detecting only geomagnetism without being influenced by radiowaves that are emitted from mobile terminal device 1. The geomagnetic sensor may employ, for example, a sensor known as a flux gate-compass such as shown in FIG. 2 that is provided with a toroidal core, an excitation coil, NS (North-South) directional detection coils, and EW (East-West) directional detection coils; or may employ a sensor such as shown in FIG. 3 that is composed of two Hall devices that are arranged in mutually orthogonal directions. The principles of detecting geomagnetism by means of these sensors is described in detail in, for example Japanese Patent Laid-Open No. 305103/1997, and explanation is here omitted.

In mobile terminal device 1 of the present invention having this type of construction, control unit 13 determines that mobile terminal device 1 is stationary when the output of the geomagnetic sensor of state detection unit 11 is observed to be equal to or less than a prescribed value for at least a particular fixed time period, as shown in FIG. 4. Alternatively, mobile terminal device 1 is determined to be moving when the output of the geomagnetic sensor is observed to fluctuate by at least a prescribed value. Finally, mobile terminal device 1 is determined to be moving at high speed when this fluctuation is observed to be great, and mobile terminal device 1 is determined to be moving at low speed when the fluctuation is slight.

The geomagnetic sensor is constantly in operation, and state detection unit 11 constantly sends the output value of the geomagnetic sensor to control unit 13. Control unit 13 determines and monitors the state of mobile terminal device 1 based on the above-described determination reference, and when mobile terminal device 1 is stationary, decreases the number of processes for acquiring positional information by means of GPS receiver 14 and positional information unit 15. When mobile terminal device 1 is moving, on the other hand, control unit 13 raises the frequency of processing for acquiring positional information by means of GPS receiver 14 and positional information unit 15. In other words, the period for executing processing to acquire positional information is made longer than a preset reference period when mobile terminal device 1 is stationary, and the period for executing processing to acquire positional information is made shorter than the reference period when mobile terminal device 1 is moving.

Reducing the number of processes for acquiring positional information when mobile terminal device 1 is stationary decreases the number of instances of operation of GPS receiver 14 which has high power consumption, and therefore enables a reduction in power consumption. On the other hand, increasing the frequency of processing for acquiring positional information when mobile terminal device 1 is moving allows mobile terminal device 1 to obtain more accurate positional information.

The display of positional information by means of the display device of user interface unit 17 may be halted when mobile terminal device 1 is stationary. In this case, display on the display device is resumed when mobile terminal device 1 is moving or when there is an incoming call from caller 4. Halting display by the display device of user interface unit 17 when mobile terminal device 1 is stationary enables a greater reduction in power consumption.

In the positional information system of the present invention, the state of mobile terminal device 1 that is determined at control unit 13 is transmitted by way of wireless unit 18 to base station 2 for each prescribed period. Base station 2 alters the frequency of transmission and reception for the positional registration process that is necessary for sending map information to mobile terminal device 1 based on the state information that has been received from mobile terminal device 1. In other words, the period for executing the position registration process is made longer than the preset reference period when mobile terminal device 1 is stationary, and the period for executing the position registration process is made shorter than the reference period when mobile terminal device 1 is moving. Changing the frequency of updating the position registration according to the state of mobile terminal device 1 in this way decreases the processes for transmitting and receiving unnecessary information.

Accordingly, mobile terminal device 1 can display accurate positional information with greater efficiency. In addition, reducing the frequency of updating position registration when mobile terminal device 1 is stationary enables a reduction in power consumption and therefore enables a reduction of the amount of consumption of the battery that is provided in power supply unit 16. Further, storing map information in storage unit 19 of mobile terminal device 1 in advance eliminates the need for base station 2 to execute position registration processing. In this case, base station 2 need not be provided with map information.

As described in the foregoing explanation, base station 2 in the positional information system of the present invention is kept informed of the state of mobile terminal device 1. As a result, when caller 4 wishes to learn the state of mobile terminal device 1, which is its communication partner, and therefore makes an inquiry as to whether mobile terminal device 1 is stationary or moving (moving at high speed), base station 2 may report the state of mobile terminal device 1 to caller 4.

In this case, caller 4 can abandon the speech communication and, depending on the state of mobile terminal device 1, convert the speech communication to character communication or delay the conversation time. For example, because mobile terminal device 1 is usually in a car or on a train when mobile terminal device 1 is moving at high speed, conversion to character communication or delaying the time of conversation can prevent accidents that result from conversing while driving or can prevent breaches of etiquette that would result from talking in a train.

In addition, when mobile terminal device 1 that has been called from Caller 4 is not able to communicate because it is moving at high speed, base station 2 may report to caller 4 that mobile terminal device 1 is moving at high speed and is therefore unable to communicate.

Further, when mobile terminal device 1 is lost, another telephone can be used to learn the current position or state of mobile terminal device 1 and thus facilitate a search.

The procedures for determining the state of mobile terminal device 1 are next explained using the flow chart shown in FIG. 5.

As described in the foregoing explanation, the state of mobile terminal device 1 includes the three states: stationary, moving, and moving at high speed; and when any flag indicating these states is raised, control unit 13 determines that mobile terminal device 1 is in the state corresponding to that flag.

When mobile terminal device 1 is stationary, and moreover, when this state has continued for at least a fixed time period, control unit 13 raises a halt flag for halting the operation of GPS receiver 14, positional information unit 15, and user interface unit 17, and stops power supply unit 16 from supplying power to GPS receiver 14, positional information unit 15, and user interface unit 17.

In mobile terminal device 1 of the present invention, mobile terminal device 1 is determined to be stationary or moving (moving at high speed) depending on whether change in the output value of the geomagnetic sensor exceeds a predetermined first set value. It is further determined whether mobile terminal device 1 is moving at low speed or moving at high speed depending on whether the change in the output value of the geomagnetic sensor exceeds a predetermined second set value.

Mobile terminal device 1 of the present invention is provided with two timers (a first timer and a second timer) in clock unit 12, and control unit 13 determines that mobile terminal device 1 is stationary when change in the output value of the geomagnetic sensor is smaller than the above-described first set value, and moreover, when this state exceeds a predetermined set time period (first set time period) of the first timer. Control unit 13 further halts the supply of power to GPS receiver 14 and positional information unit 15 or user interface unit 17 when this state exceeds the predetermined set time period of the second timer (second set time period).

As shown in FIG. 5, the initial state of mobile terminal device 1 is stationary, this being a state in which the stationary flag is raised. When the state detection process of mobile terminal device 1 begins from this state, control unit 13 compares the output value of the geomagnetic sensor and the first set value in Step 101 and, detects whether or not the output value of the geomagnetic sensor is equal to or greater than the first set value to determine whether there has been a change in geomagnetism.

If there is no change in geomagnetism, control unit 13 determines whether the first timer is operating or not in Step 102, and activates the first timer in Step 103 if the first timer is not operating. In Step 104, control unit 13 next determines whether the first timer has come to the end of its time period and the first set time period has elapsed, and if the first set time period has not elapsed, returns to the process of Step 101 and repeats the processes of Steps 101-104. If the first set time period has elapsed, control unit 13 raises a stationary flag in Step 105 and determines that mobile terminal device 1 is stationary.

Control unit 13 next activates the second timer in Step 106, and in Step 107, determines whether the second timer has reached the end of its time period and the second set time period has elapsed. If the second set time period has not elapsed, control unit 13 returns to the process of Step 101 and repeats the processes of Steps 101-107. If the second set time period has elapsed, control unit 13 raises the halt flag in Step 108, and, as described above, causes power supply unit 16 to halt the supply of power to GPS receiver 14, positional information unit 15, and user interface unit 17.

If a change in geomagnetism is detected in the process of Step 101, control unit 13 determines in Step 109 whether a halt flag is raised, and if a halt flag is raised, causes power supply unit 16 to start supplying power to GPS receiver 14 and positional information unit 15 in Step 110. Further, if a halt flag is not raised, first timer and second timer are each halted in Step 111.

Control unit 13 next compares the output value of the geomagnetic sensor and the second set value in Step 112, and detects whether the output value of the geomagnetic sensor is equal to or greater than the second set value.

If the output value of the geomagnetic sensor is less than the second set value, control unit 13 raises a moving flag, determines in Step 113 that mobile terminal device 1 is moving at low speed, and then returns to the process of Step 101 and repeats the processes of Step 101 and Steps 109-112. On the other hand, if the output value of the geomagnetic sensor is equal to or greater than the second set value, control unit 13 raises the moving at high speed flag and determines that mobile terminal device 1 is moving at high speed in Step 114. Control unit 13 then returns to the process of Step 112 and repeats the process of comparing the output value of the geomagnetic sensor and the second set value.

Due to the changes in geomagnetic strength resulting from the current position of mobile terminal device 1, the first set value and second set value for detecting the state of mobile terminal device 1 are preferably rewritten. In the present invention, the area that is managed by the positional information system is divided into a plurality of blocks according to the geomagnetic strength and optimum first set values and second set values are then registered for the blocks in each base station 2. When mobile terminal device 1 uses GPS to obtain positional information, the first set value and second set value that accord with the position are each received from base station 2 and recorded in storage unit 19. By the addition of this function, the first set value and second set value are updated to optimum values despite variations in geomagnetism according to location and the state of mobile terminal device 1 can be more accurately determined.

While a preferred embodiment of the present invention has been described using specific terms, such description is for illustrative purposes only, and it is to be understood that changes and variations may be made without departing from the spirit or scope of the following claims.

What is claimed is:

1. A positional information system comprising:
   a mobile terminal device, comprising:
   a positional information acciuisition unit for acquiring positional information, which is information of the current location;
   a user interface unit for displaying said positional information;
   a power supply unit for supplying power to said positional information acquisition unit and said user interface unit; and a wireless unit for transmitting information to and receiving information from the outside;

a geomagnetic sensor for detecting geomagnetism; and a control unit for comparing the output value of said geomagnetic sensor with a first set value that has been set in advance; determining that said mobile terminal device is stationary when the output value of said geomagnetic sensor continues to be less than said first set value for at least a first set time period that has been set in advance; and determining that said mobile terminal device is moving when the output value of said geomagnetic sensor fluctuates by at least said first set value, wherein said control unit:

makes the period of executing a positional information acquisition process for acquiring positional information longer than a reference period that has been set in advance when said mobile terminal device is stationary, and makes said period of executing said positional information acquisition process shorter than said reference period when said mobile terminal device is moving, causes a halt of the supply of power from said power supply unit to said positional information acquisition unit and said user interface unit when the output value of said geomagnetic sensor continues to be a value that is smaller than said first set value for a time period that is equal to or greater than a second set time period that has been set in advance in addition to said first set time period; and a base station that holds a first set value that is set in advance in accordance with the geomagnetic strength in its own vicinity and that transmits said first set value to said mobile terminal device, the base station comprising:

means for outputting a moving state of said mobile terminal device to a caller who is currently engaged in a call to said mobile terminal device, when said caller outputs a mobile terminal device movement enquiry request, wherein the call between said caller and said mobile terminal device is capable of being changed from speech communications to character communications between said caller and a user of said mobile terminal device, based on a conversion made by a communications device of said caller under control of said caller, wherein character communications is made instead of speech communications when the mobile terminal device is determined to be moving at a high rate of speed.

2. A method of controlling a positional information system, said positional information system being provided with:

a mobile terminal device that is provided with a positional information acquisition unit for acquiring positional information, which is information of the current location, and a user interface unit for displaying said positional information; and a base station that transmits information to and receives information from said mobile terminal device;

said method comprising the steps of:

comparing an output value of a geomagnetic sensor that detects geomagnetism in the vicinity of said mobile terminal device with a first set value that has been set in advance;

determining that said mobile terminal device is stationary when the output value of said geomagnetic sensor continues to be smaller than said first set value for at least a first set time period that has been set in advance;

determining that said mobile terminal device is moving when the output value of said geomagnetic sensor fluctuates by at least said first set value;

transmitting said determination results to said base station;

when said mobile terminal device is stationary, making the period of executing a process of registering the position of said mobile terminal device to said base station longer than a reference period that has been set in advance; and when said mobile terminal device is moving, making said period of executing a process of registering the position shorter than said reference period, wherein:

when said mobile terminal device is stationary, the period of executing a positional information acquisition process for acquiring positional information is made longer than a reference period that has been set in advance; and when said mobile terminal device is moving, the period of executing the positional information acquisition process is made shorter than said reference period, wherein the supply of power to said positional information acquisition unit and said user interface unit is halted when the output value of said geomagnetic sensor continues to be a value that is smaller than said first set value for at least a second set time period that has been set in advance in addition to said first set time period, wherein the call between said caller and said mobile terminal device is capable of being changed from speech communications to character communications between said caller and a user of said mobile terminal device, based on a conversion made by a communications device of said caller under control of said caller, wherein character communications is made instead of speech communications when the mobile terminal device is determined to be moving at a high rate of speed.

3. The positional information system according to claim 1, wherein the caller is capable of delaying the speech communication time between the caller and the user of the mobile terminal device based on a selection made by the caller.

4. The method of controlling a positional information system according to claim 2, further comprising:

delaying, by the caller, the speech communication time between the caller and the user of the mobile terminal device based on a selection made by the caller.

* * * * *